United States Patent [19]
Love

[11] Patent Number: 5,961,825
[45] Date of Patent: Oct. 5, 1999

[54] COATED CYLINDRICAL ROTARY DRUM FOR A SKIMMER APPARATUS

[75] Inventor: Jack L. Love, The Woodlands, Tex.

[73] Assignee: Abasco, Inc., Houston, Tex.

[21] Appl. No.: 08/994,392

[22] Filed: Dec. 19, 1997

[51] Int. Cl.⁶ .................................................. E02B 15/04
[52] U.S. Cl. ...................... 210/238; 210/242.3; 210/923; 427/195; 427/203
[58] Field of Search ................................ 210/238, 242.3, 210/923, 784, 242.4; 427/195, 203

[56] References Cited

U.S. PATENT DOCUMENTS

| | | |
|---|---|---|
| 3,426,902 | 2/1969 | Kilpert et al. . |
| 3,670,896 | 6/1972 | Hale, Jr. et al. . |
| 3,968,041 | 7/1976 | DeVoss . |
| 4,013,561 | 3/1977 | Murphy . |
| 4,596,724 | 6/1986 | Lane et al. . |
| 4,681,680 | 7/1987 | Delons et al. . |
| 4,957,636 | 9/1990 | Wilson et al. . |
| 5,028,325 | 7/1991 | Hamilton . |
| 5,200,083 | 4/1993 | Kaylor . |
| 5,314,618 | 5/1994 | Kaylor et al. . |
| 5,688,843 | 11/1997 | Inaoka et al. . |
| 5,743,694 | 4/1998 | Hines . |
| 5,792,350 | 8/1998 | Sorley et al. . |

OTHER PUBLICATIONS

Specification of Wisconsin Coatings, published prior to Oct., 1996, 4 pages.

*Primary Examiner*—Jay H. Woo
*Assistant Examiner*—Fred Prince
*Attorney, Agent, or Firm*—Mayor, Day, Caldwell & Keeton, LLP; Gary L. Bush

[57] ABSTRACT

A coated metal drum (38) for a skimmer apparatus mounted on a buoyant frame (10) floating on a body of water for removal of hydrocarbon material from the body of water. The coated drum (38) has a metal drum base (80) which is blasted to provide a roughened cylindrical surface for the coating (84, FIG. 4). The coating comprises a vinyl ester resin material which is sprayed in a plurality of layers (86) onto the roughened metal surface and is cured to provide a hard abrasion resistant surface for the adherence of hydrocarbon material thereon.

8 Claims, 4 Drawing Sheets

COATED CYLINDRICAL ROTARY DRUM FOR A SKIMMER APPARATUS

FIELD OF THE INVENTION

This invention relates to a coated cylindrical rotary drum for a skimmer apparatus, and more particularly, to such a coated cylindrical drum in which the coating material on the rotary drum provides an abrasive resistant outer cylindrical surface for the adhesion of a hydrocarbon material removed from the surface of a body of water.

BACKGROUND OF THE INVENTION

Heretofore, skimmer apparatus for the recovery of hydrocarbon material floating on the surface of a body of water have utilized rotary drums for contacting and removing the material. A scraper is normally provided for contacting and scraping the outer surface of the drum to remove the material from the drum for collection within a lower collection reservoir where it may be removed by a suction line. The outer cylindrical surface of the drum is subjected to the scrapping or abrasive action of the scrapper and must be abrasion resistant for prolonging the life of the drum or outer covering on the drum. In addition, the outer cylindrical surface of the drum should be texturized or roughed in order to provide an adhering surface for the hydrocarbon material. It is has been difficult to provide an outer covering or surface for the drum which has required properties for being sufficiently abrasion resistant while providing a sufficiently rough or texturized surface for adhering hydrocarbon material.

For example, U.S. Pat. No. 5,200,083 dated Apr. 6, 1993 shows a skimmer having a rotary cylindrical drum including an inner layer of a plastic material about the drum and an outer oil contacting layer secured to the inner layer. The second outer layer is formed of a non-woven mat made of polymer fibers which provide an adhesive outer surface for oil. The inner and outer layers are cut away when replacement is required. Thus, two separate layers over the drum are required and an inner layer by itself has a thickness between twenty and fifty mils.

U.S. Pat. No. 3,670,896 dated Jun. 20, 1972 shows a skimmer apparatus in which a rotary drum is mounted on the bow of a boat or barge and the oil adheres to the drum surface for removal by the action of a wiper blade. The drum or collection member has a relatively smooth surface coated or otherwise formed of a material including a high molecular weight hydrocarbon material, such as nylon. The drum surface can be fabricated of the high molecular weight hydrocarbon material or a coating may be applied to the drum which may be metal, plastic or the like. When a synthetic hydrocarbon material is used such as nylon, the entire roller may be fabricated, such as by casting. By using a relatively smooth collection surface having a high molecular weight solid hydrocarbon material, the oil adhering to the collection surface is wiped off minimizing wear and the need for replacement. In one embodiment, endless conveyor belts are utilized as the collection member to remove oil from the surface of a body of water.

SUMMARY OF THE INVENTION

The skimmer apparatus utilizing the coated cylindrical rotary crum of the invention includes a buoyant frame floating on a body of water which preferably comprises a pair of spaced pontoons and includes a collection reservoir for the hydrocarbon material recovered from the body of water. The coated cylindrical rotary drum is rotatably supported on the buoyant frame, and a scraper device having scraping contact with the surface of the drum scrapes the material from the surface of the drum for depositing into the collection reservoir. The cylindrical drum is formed of a metallic material and the outer cylindrical surface of the drum is first blasted with an abrasive material to a predetermined roughness for an anchoring surface. Then, a plurality of coats of a predetermined vinyl resin are applied to the roughened surface of the drum to provide a predetermined thickness. Each separate vinyl resin coating is cured for a predetermined time period before a subsequent coating is applied to provide an abrasive resistant surface of a predetermined thickness for adhering hydrocarbon material. The plurality of coats of the vinyl resin material are preferably applied by spraying the vinyl resin on the drum. The coat is applied to the surface of the metallic drum with a minimal surface temperature of the drum about 60° F.

The cylindrical rotary drum is coated with a vinyl resin material which consists of three separate parts. Part I is a base material and Part II consists of various pigments and catalysts. Part III comprises a catalyst. After mixing of the three parts, the vinyl resin material is applied in a plurality of coats by a conventional atomizing spray system having a pump. The vinyl resin material is continuously mixed during the spraying operation and the number of coats depends on the desired thickness of the coating. The curing time depends primarily on the temperature of the metal drum. A suitable vinyl resin material is sold under the name "PLA-SITE 4110 VINYL ESTER HEAVY DUTY COATING" by Wisconsin Protective Coatings Corp., of Green Bay, Wis.

After application of the plurality of coats of the vinyl resin material and curing on the cylindrical rotary drum, the drum is positioned on the buoyant frame of the skimmer apparatus in a body of water and mounted for rotation by a drive motor. The drum is mounted for adjustable movement relative to the buoyant frame and a scraper engages the drum for scraping material recovered from the body of water adhering to the cylindrical surface of the drum. The scraped material falls downwardly by gravity into a collection reservoir.

It is an object of the present invention to provide a cylindrical rotary drum coated with a vinyl resin material for a skimmer system for recovering material from the surface of a body of water.

Another object of the invention is the provision of such a cylindrical rotary drum for a skimmer system in which a cylindrical metal drum is coated with a plurality of coats of a vinyl resin material applied by spraying onto a clean, rough surface of the metal drum.

Other objects, features, and advantages of the invention will be apparent upon a review of the following specification and drawings.

DESCRIPTION OF THE INVENTION

Figure 1:
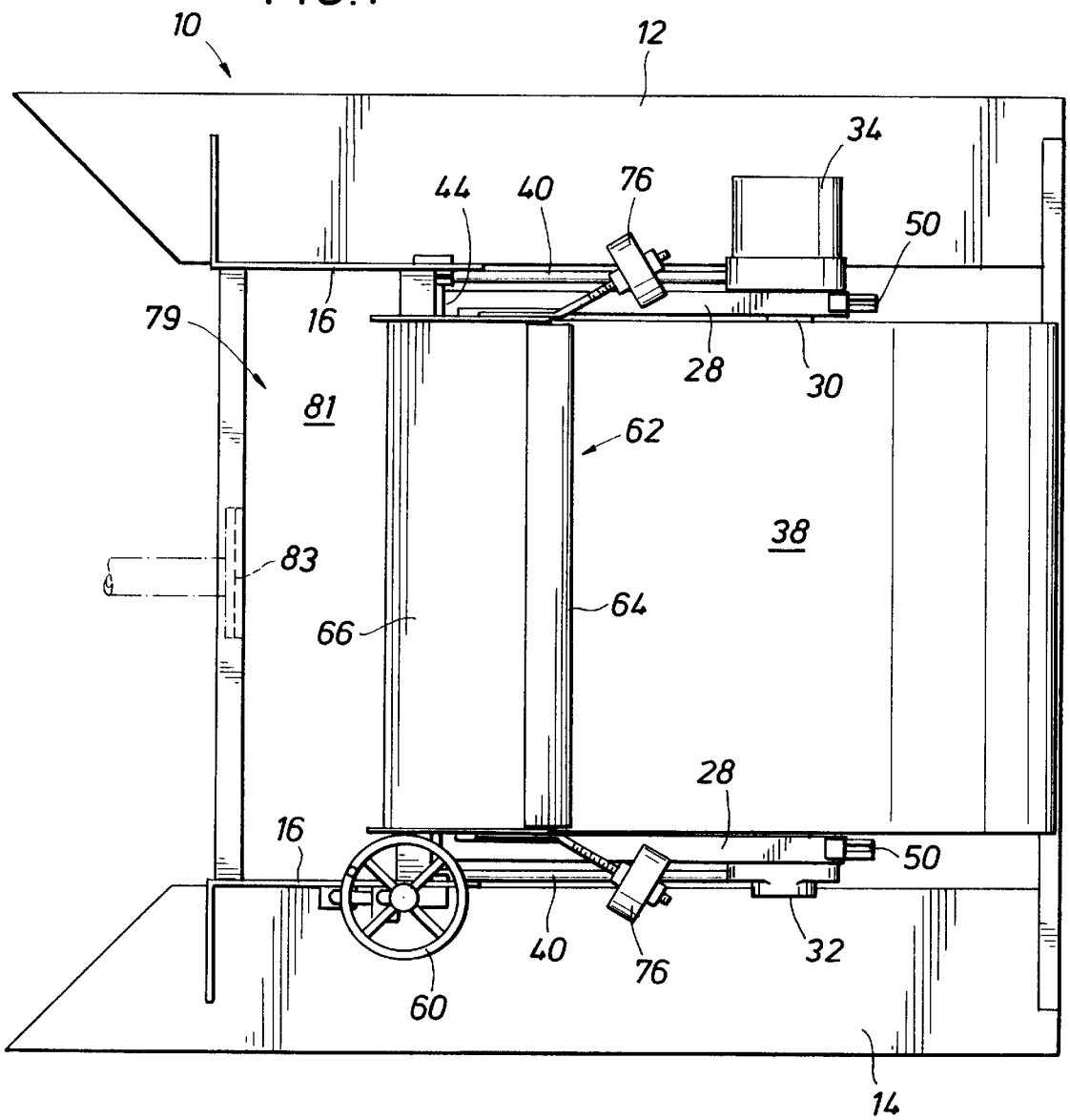
FIG. 1 is a top plan of the coated cylindrical rotary drum embodying the present invention and showing the cylindrical drum mounted for rotation on a skimmer apparatus having a buoyant frame with a pair of spaced pontoons.

The skimmer system utilized with the coated cylindrical rotary drum comprising the present invention for recovering hydrocarbon material from the surface of a body of water is shown in the drawings and comprises a buoyant frame generally indicated at 10 including a pair of spaced pontoons 12 and 14 of a generally rectangular cross-section. Mounting brackets 16 are secured to the upper surface of pontoons 12 and 14.

A drum support indicated at 20 has a base member 22 mounted on hinge 24 having ends secured between brackets 16. Base member 22 is mounted on a leaf of hinge 24 for pivotal movement about hinge shaft 26. A pair of spaced side support arms 28 are secured to base member 22. A drive shaft 30 is mounted for rotation in bearings 32 secured to support arms 28. A motor 34 is mounted on adjacent bracket 16 for rotating drum shaft 30.

Figure 3:
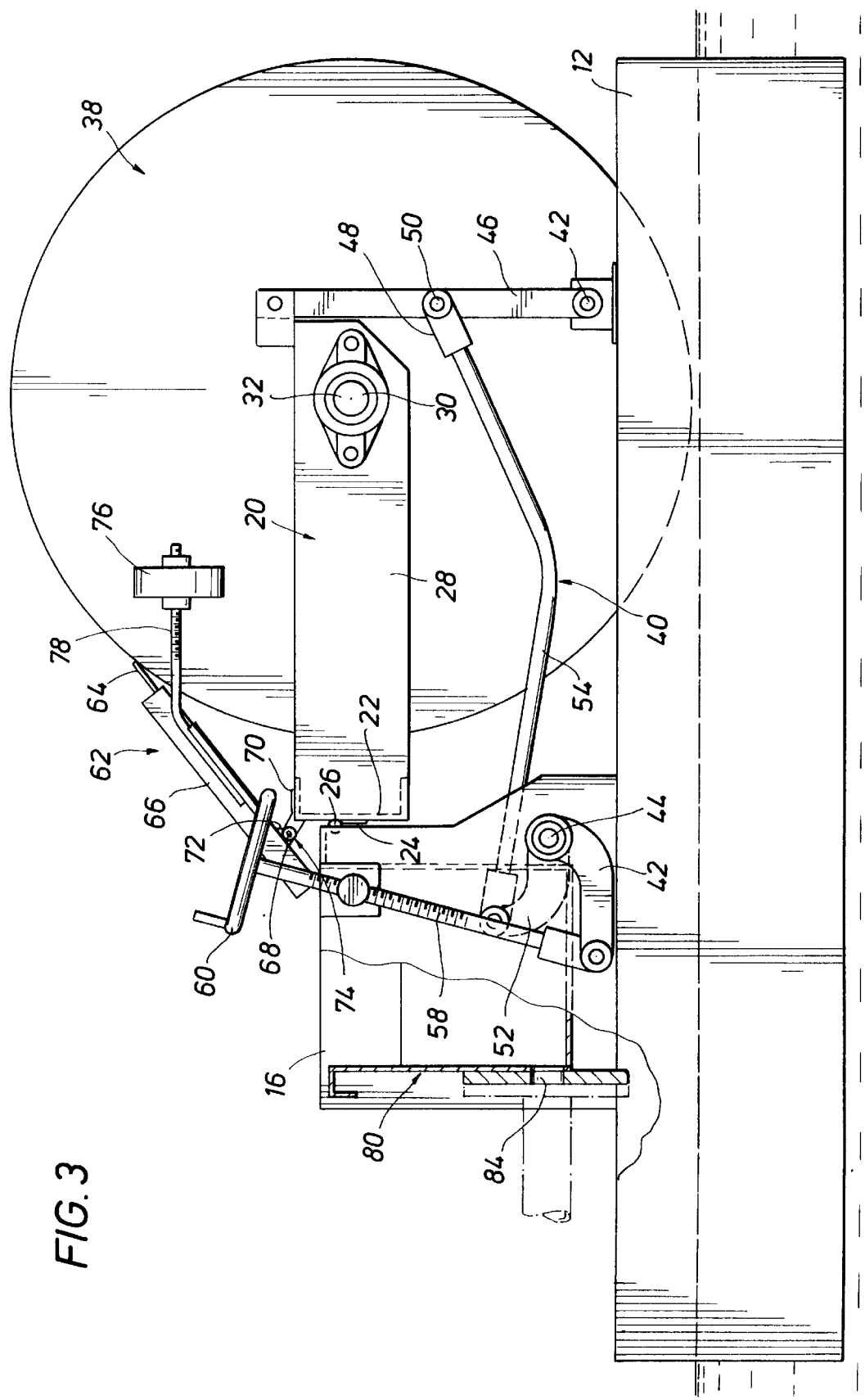
FIG. 3 is a side elevational view, partly in section, showing in a raised position the coated cylindrical rotary drum and scraper contacting the outer cylindrical surface of the drum base with the drum mounted for adjustable movement relative to the buoyant frame.
Figure 4:
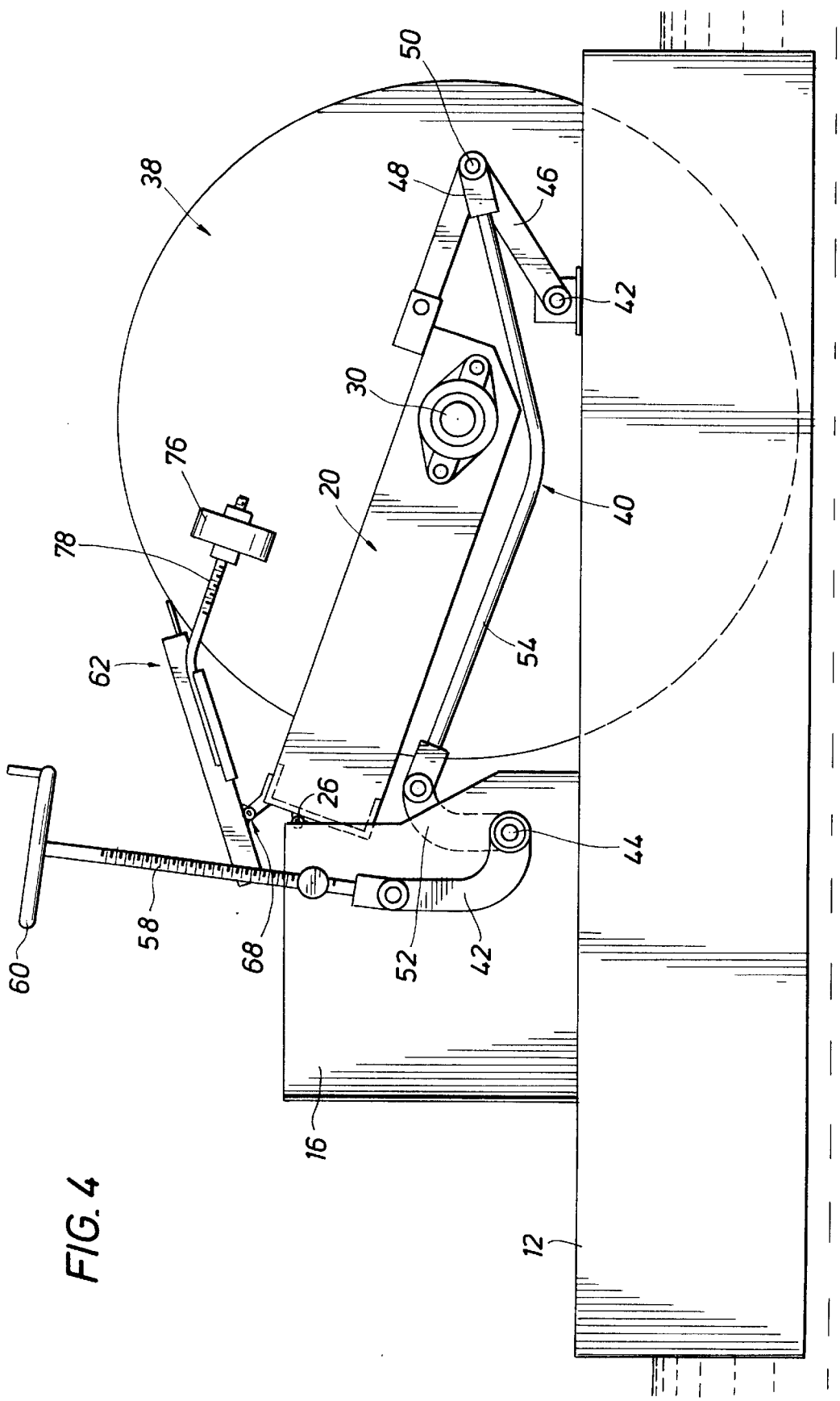
FIG. 4 is a side elevational view similar to FIG. 3 but showing the cylindrical rotary drum and scraper in a lowered position.

A coated rotary cylindrical drum comprising the present invention is shown generally at 38 and is mounted on shaft 30 for rotation. It is desirable to have rotary cylindrical drum 38 mounted for movement in a generally vertical direction relative to the buoyant frame indicated at 10. For this purpose, a toggle arrangement generally indicated at 40 in FIG. 3 is connected to support arms 28 for pivoting arms 28 and drum 38 about shaft 26 relative to buoyant frame 10. An actuating shaft 44 mounted for rotation about a fixed pivot has an arm 42 secured thereto. A threaded rod 58 connected to an end of arm 42 has a handwheel 60 connected at an opposed end thereof to rotate shaft 44. A crank or drive arm 52 fixed to shaft 44 is moved upon rotation of shaft 44. A toggle arm 54 extends between crank arm 52 and pivot 50. A toggle arm 46 is connected to arm 54 by pivot 50. Toggle arm 46 is mounted for pivotal movement about a fixed pivot 42. Arm 52 may be adjusted by manual operation of handwheel 60. Thus, handwheel 60 may be selectively rotated for adjusting the position of rotary drum 38 on the skimmer apparatus.

Figure 2:
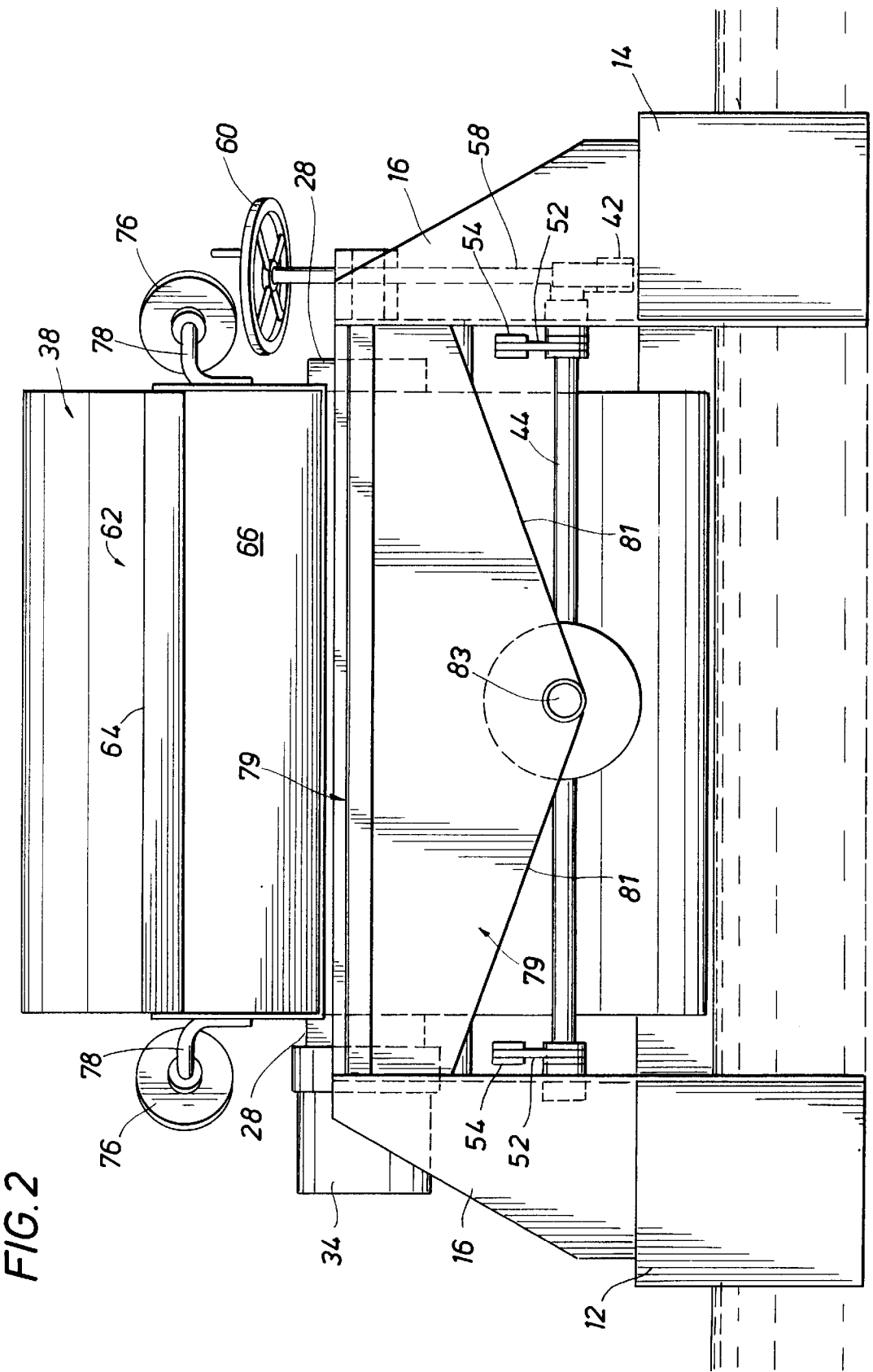
FIG. 2 is a front elevational view of the skimmer apparatus shown in FIG. 1 and having a collection reservoir beneath the rotary drum for collecting hydrocarbon material adhering to the cylindrical surface of the coated drum and scraped from the drum by the scraper.

As rotary drum 38 is rotated and recovers hydrocarbon material floating on the surface of the water, it is desirable to provide means for scraping the collected material from the cylindrical surface of drum 38 and to deposit the material into a collection reservoir beneath the drum. A scraper device or scraper assembly is shown generally at 62 in FIG. 3 and includes a scraper blade 64 secured to a retaining plate 66. A hinge generally indicated at 68 has a leaf 70 secured to base member 22 and a leaf 72 is secured to retaining plate 66 at hinge shaft 74. A weight 76 on rod 78 secured to each side of plate 66 may be adjusted along the length of rod 78 to adjust the force supplied by scraper blade 64 against rotary drum 38. The material scraped from the cylindrical surface of drum 38 falls downwardly by gravity into a collection reservoir shown generally at 79 in FIG. 2 and having inclined bottom portions 81 extending to an open-ended outlet tube 83. A connection flange on outlet tube 83 provides for connection of a discharge pump or suction device to the reservoir for removing the collection of materials that is deposited therein.

Figure 5:
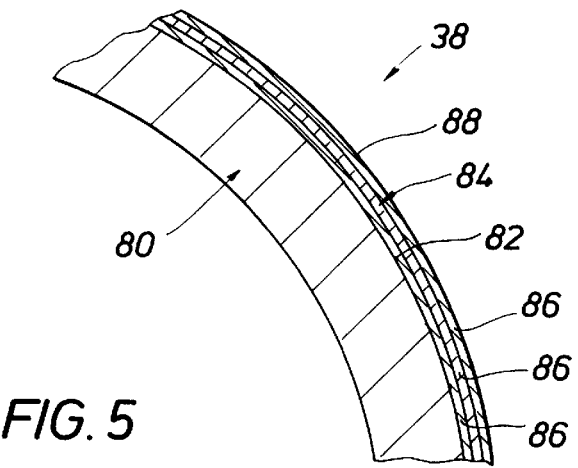
FIG. 5 is an enlarged cross-sectional view of a portion of the coated drum showing the outer vinyl resin covering over the rough cylindrical surface of a metal drum base.

The coated cylindrical rotary drum 38 forming the present invention is mounted on the skimmer apparatus as set forth above for rotation on the surface of a body of water for removal of hydrocarbon material. An important feature of rotary drum 38 comprises the coating of rotary drum 38 with a vinyl ester resin by spraying the resin material onto the roughened blasted surface of a cylindrical metal drum 80 as shown particularly in FIG. 5. Metal drum base 80 which is preferably formed of aluminum is of a hollow cylindrical shape. The outer cylindrical surface 82 of metal drum base 80 is first chemically cleaned preferably with a methyl ethyl ketone. Then, the outer cylindrical surface 82 is blasted with aluminum oxide particles of a predetermined particle size microns to create a profile of the base aluminum metal of 0.003 inch which is generally equivalent to a 250 RMS (root mean square) surface.

A vinyl ester coating manufactured and sold under the name "PLASITE 4110" by Wisconsin Protective Coatings Corp. is prepared according to the specification of the manufacturer and includes three parts. Parts I and II which include an inert flake pigment are mixed and then Part III which contains a catalyst is mixed with Parts I and II. A suitable abrasive resistant additive is also added to the mix. The coating shown at 84 is then sprayed with atomizing spray equipment onto the prepared surface 82 in a plurality of layers 86 to obtain an optimum thickness between about 0.018 inch and 0.025 inch. A coating thickness between 0.018 inch and 0.025 inch may be obtained with two separate coats. The first coat is applied with a 38 psi pressure at the spray nozzle tip and is precured for about two hours at a temperature over about 60° F. before application of the second coat. The second coat is applied with a 25 psi pressure at the spray nozzle tip to provide a suitable surface profile. The coating is then precured for about two hours at a temperature over about 60° F. Then, the rotary drum is with the coating thereon is placed within an oven for curing for four hours at 250° F. Now, the coated rotary drum 38 may be positioned on the skimmer apparatus. The curing time may vary, depending primarily on the temperature of the metal drum base 80. If the rotary drum is not positioned within a oven for curing, a curing time between about seven (7) and ten (10) days may be required at ambient temperatures between about 60° F. and 90° F.

The outer cylindrical surface 88 of coating 84 is formed by spraying of the vinyl resin coating 84 thereon and a roughness suitable for adherence of oil or hydrocarbon material thereon when drum 38 is rotated in a partially submerged position within a body of water is obtained. The roughness is obtained naturally from the vinyl resin coating and has been found to be highly effective for the adherence of oil or hydrocarbon material thereon. The roughness is controlled by the air pressure used to apply the coating. A surface of a 0.01 inch profile is desired and defines the difference between the lowest valley and highest peak of outer profile 88.

Coating 84 is subjected to substantial abrasion and friction by contact of scraper blade 64 thereon which is effective to scrape the adhering oil or hydrocarbon material from outer cylindrical surface 88 for deposit in collection reservoir 80. A hard abrasion resistant coating 84 is provided having an abrasive resistance with an average loss per one thousand cycles Taber CS-17 wheel, 1,000 gram weight, of 11 milligrams. A surface hardness is provided having a Konig pendulum hardness of 134 seconds (glass standard equal 250 seconds), ASTM method D 4366-84. Thus, a hard abrasion resistant outer surface 88 is provided by coating 84 which has been found to be high y effective and long lasting in the recovery of oil or oil bearing materials from the surface of a body of water.

In the event outer coating 84 becomes worn, it is replaced by blasting of coating 84 from metal drum base 80. After removal of coating 84, a new coating is applied in accordance with the above invention. Under some circumstances, a small defective or worn area may be re-coated. The present invention in utilizing a vinyl ester coating which is sprayed onto the outer roughened surface of a metal cylindrical drum and is cured thereon has been found to provide a highly effective coating.

While a preferred embodiment of the present invention has been illustrated in detail, it is apparent that modifications and adaptations of the preferred embodiment will occur to those skilled in the art. However, it is to be expressly understood that such modifications and adaptations of the preferred embodiment will occur to those skilled in the art. However, it is to be expressly understood that such modifications and adaptations are within the spirit and scope of the present invention as set forth in the following claims.

What is claimed is:

1. A coated cylindrical drum rotatably supported on a skimmer apparatus floating on a body of water for removal of hydrocarbon material from the body of water; said coated cylindrical drum comprising:

a cylindrical metal base having an outer cylindrical roughened surface; and an outer vinyl ester resin coating secured to said metal base and having a plurality of layers sprayed onto said metal base at separate time intervals to provide a coating thickness between about 0.018 inch and about 0.025 inch, said coating having an outer cylindrical surface with a rough texture to provide a roughened tractive surface for the hydrocarbon material to be removed from the body of water.

2. A coated cylindrical drum as set forth in claim 1 wherein said cylindrical metal base is formed of aluminum.

3. In a skimmer device for recovering material from the surface of a body of water having a buoyant frame floating on the body of water including a collection reservoir, a generally cylindrical rotary drum rotatably supported on said buoyant frame and defining a cylindrical outer surface for recovering material from the surface of the body of water, and a scraper device having scraping contact with said cylindrical surface of said drum with material scraped from said cylindrical surface of said drum deposited into said collection reservoir; said drum having an improved coating thereon and comprising:

a cylindrical metal base having a roughened outer cylindrical surface; and an outer vinyl ester resin coating on said cylindrical metal base forming said cylindrical outer surface for contact by said scraper device, said vinyl ester resin coating having a rough textured surface for engagement by said scraper and for providing a roughened traction surface for the hydrocarbon material to be recovered from the surface of the body of water, said outer vinyl ester resin coating having a plurality of layers sprayed onto said metal base at separate time intervals to provide the desired coating thickness.

4. In a skimmer device as set forth in claim 3 wherein said cylindrical metal base is formed of aluminum.

5. In a skimmer device as set forth in claim 3 wherein said vinyl ester resin coating has a thickness between about 0.018 inch and about 0.025 inch.

6. In a skimmer device as set forth in claim 3 wherein said scraper device has a scraper including a weight forcing said scraper into scraping contact with the outer cylindrical surface of said vinyl ester resin coating; and means to adjust the position of said weight to vary the force of said scraper against said outer cylindrical surface of said coating.

7. In a skimmer device as set forth in claim 6 wherein adjusting means are mounted on said buoyant frame to mount said drum and scraper device for movement in a generally vertical direction relative to said buoyant frame to adjust the position of said drum and scraper relative to said body of water.

8. In a skimmer device as set forth in claim 7 wherein said adjusting means comprises a manually operated member for gripping by an operator for pivoting said scraper device and said drum about a generally horizontal axis.

* * * * *